Sept. 23, 1958 W. L. CHERRY, JR 2,853,700
AIRCRAFT DRIFT INDICATOR
Filed July 6, 1949 4 Sheets-Sheet 1
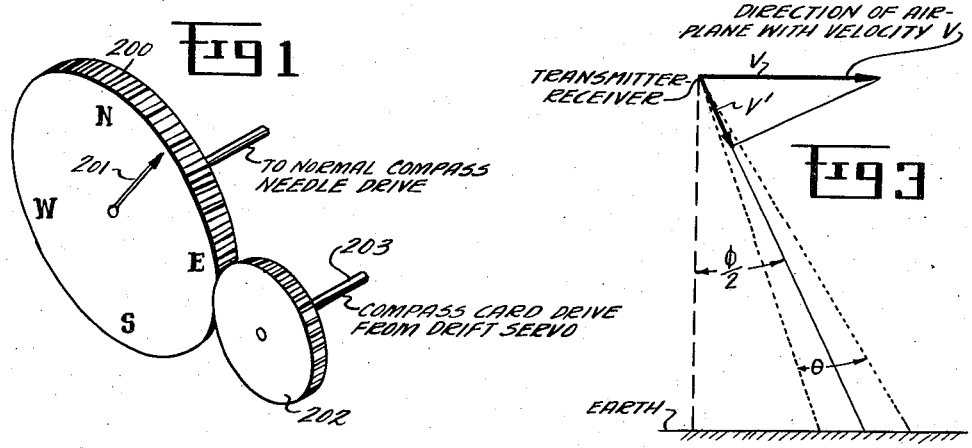
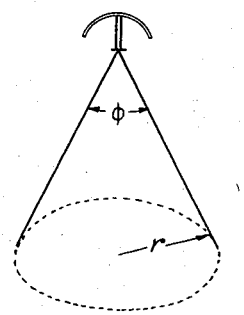
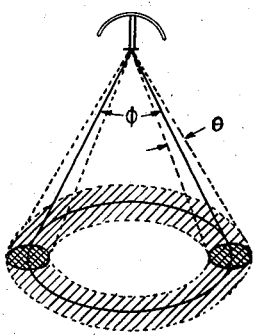
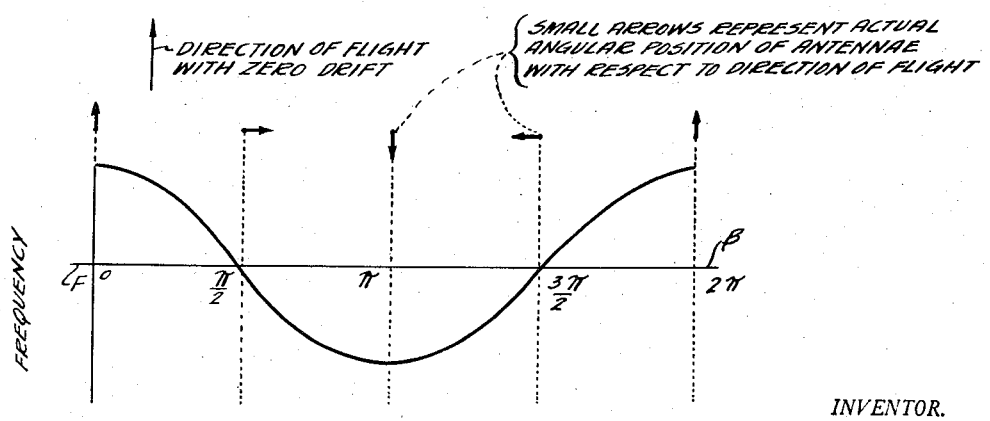
INVENTOR.
WALTER L. CHERRY JR.

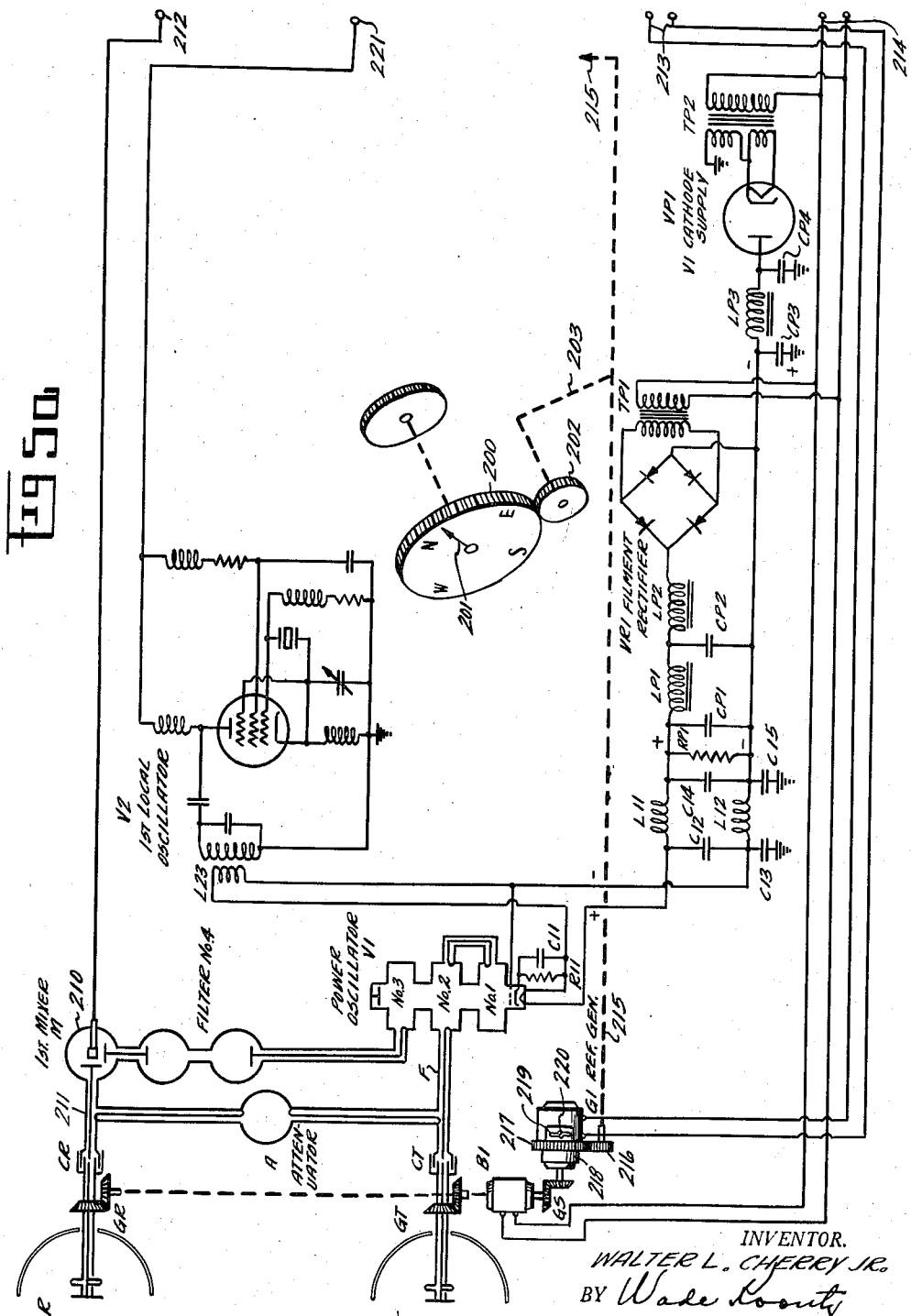

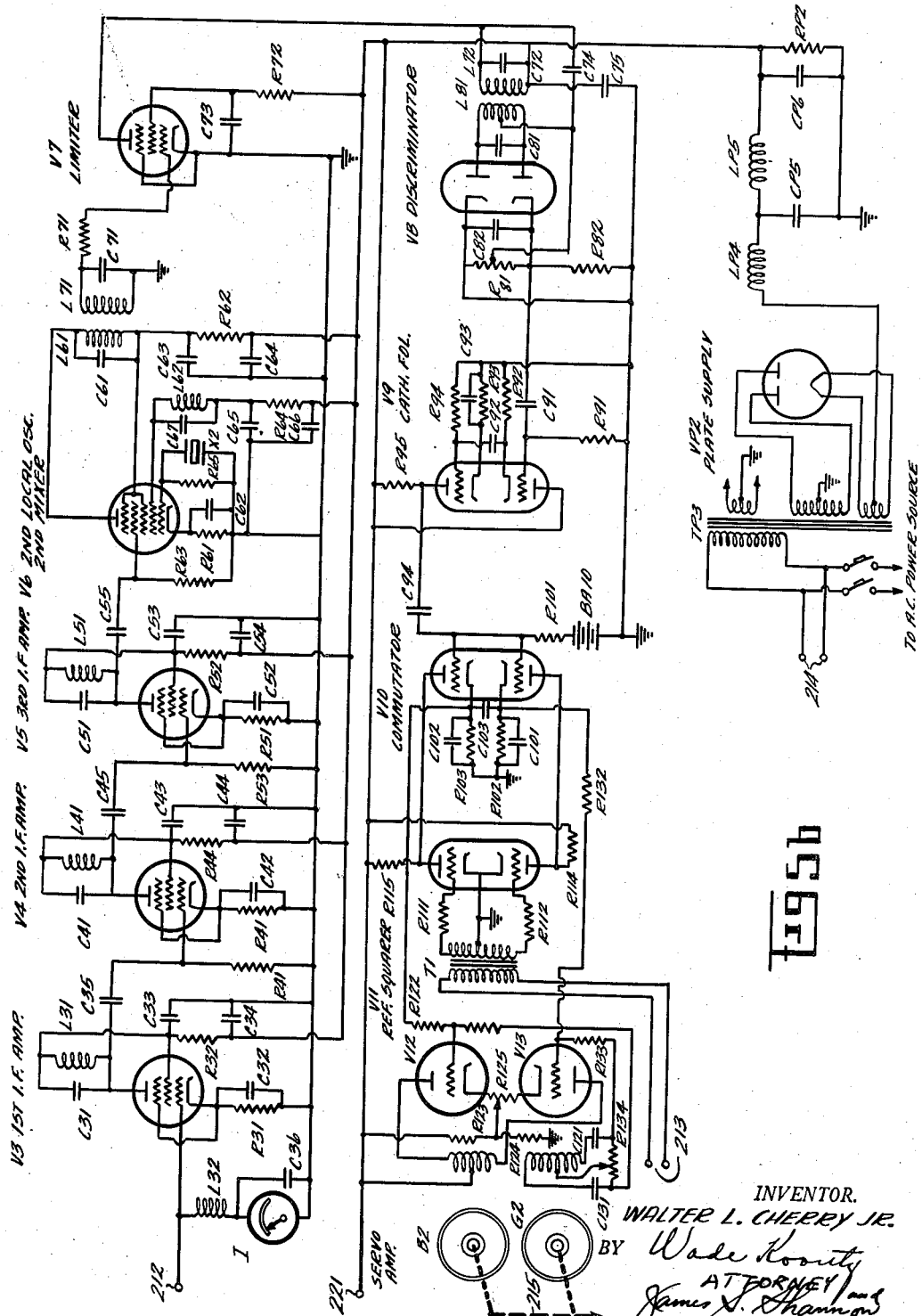

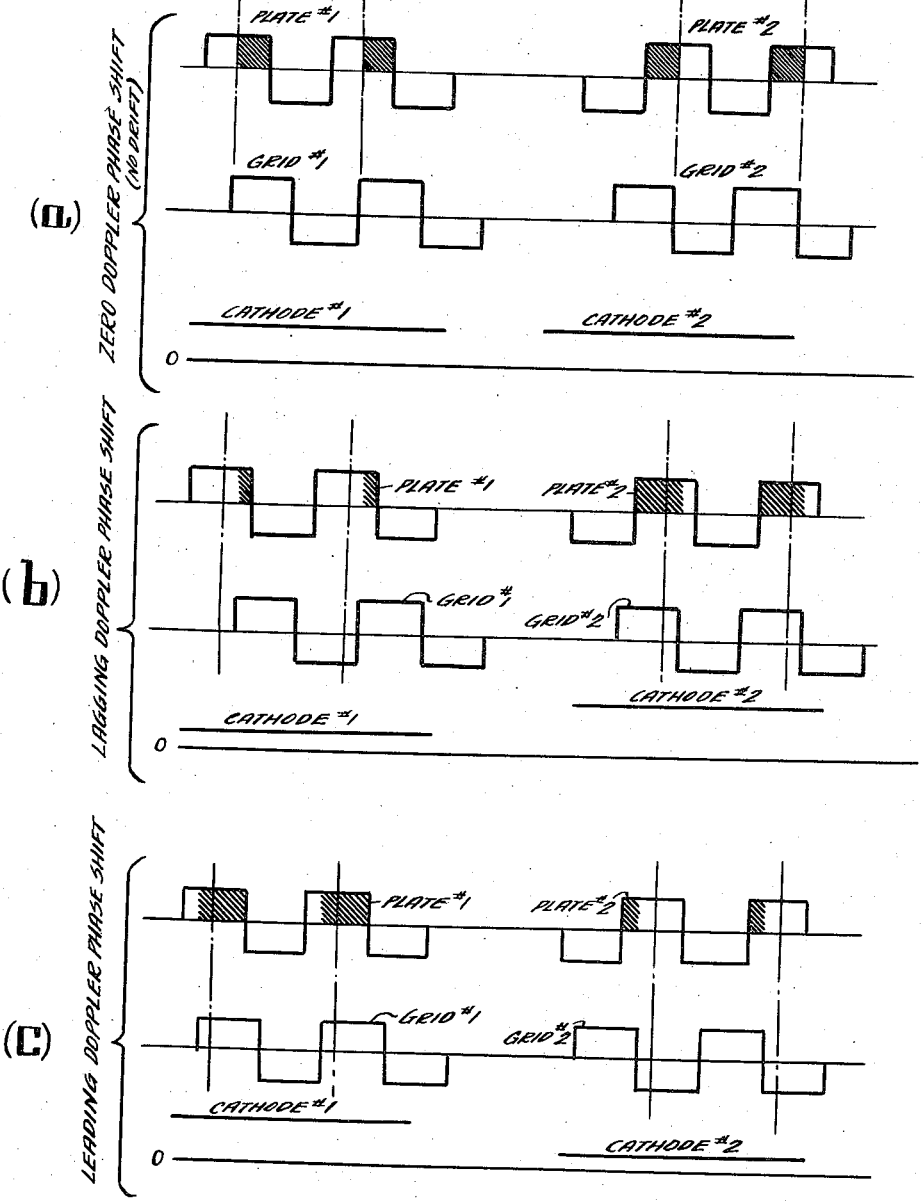

United States Patent Office 2,853,700
Patented Sept. 23, 1958

2,853,700
AIRCRAFT DRIFT INDICATOR

Walter L. Cherry, Jr., Northbrook, Ill.

Application July 6, 1949, Serial No. 103,281

4 Claims. (Cl. 343—7)

(Granted under Title 35, U. S. Code (1952), sec. 266)

The invention described herein may be manufactured and used by or for the Government for governmental purposes without payment to me of any royalty thereon.

This invention relates in general to drift meters for airplanes.

It is the purpose of the invention to provide an instrument for the aerial navigator which will continuously indicate the direction of maximum speed of the airplane as referred to the earth's surface. By comparing this direction with the airplane's apparent direction, as found by ordinary compass, the angle of drift is constantly made known to the navigator.

It is a further purpose of the invention to provide an instrument such as described above that operates automatically and continuously, with no attention from the navigator, irrespective of visibility of the earth or sky.

A simple means for indicating the actual direction of flight comprises, in accordance with the invention, a compass in which the needle is driven from a master compass in the usual manner. In place of the conventional compass card, however, is substituted a card similar to the normal one but free to rotate about the same axis as the needle and driven by the drift data in such a manner that it has an angular displacement from the aircraft's apparent direction equal to the difference in the angles of apparent direction of flight and actual direction of flight. Thus the compensation for drift becomes automatic, for the navigator now reads a compass constantly corrected for drift, and his compass reading is the true direction of flight of the aircraft as referred to the earth.

The apparatus for obtaining the drift data utilizes the Doppler frequency change present in high frequency radio waves when there is relative motion between the transmitter-receiver and a reflecting object, which in this case is the earth. The aircraft carries similar transmitting and receiving antennas designed to have beams as sharp as possible and to scan conically about a vertical axis. The scanning of the two antennas is synchronized so that the angle in the horizontal plane between the scanning beam and the longitudinal axis of the airplane is always the same for both antennas. The transmitting antenna radiates a high frequency wave and the reflections of this wave intercepted by the receiving antenna vary in frequency, due to the Doppler effect, from a maximum value when the antenna beams are pointing in the direction of travel of the airplane to a minimum value when the beams are pointing 180° away from the direction of travel of the airplane. This frequency variation is sinusoidal and has a period equal to the scanning period. The received frequency modulated wave described above is converted by means of a limited and discriminator in the receiver into a sinusoidal voltage wave of the scanning frequency. By comparing the phase of this voltage with that of the scanning cycle, referenced to the longitudinal axis of the aircraft, information as to the angle between the true and apparent directions of the airplane is obtained. A servo-control system capable of making this comparison is provided and operates to keep the compass card rotated from its no-drift position through an angle equal in magnitude and opposite in sense to the angle of drift. The compass therefore directly reads the true direction of flight with reference to the earth.

The specific details of a suitable apparatus utilizing the principles of the invention will be described in connection with the accompanying drawings in which Fig. 1 illustrates the type of indicator employed;

Figs. 2a and 2b show the scanning pattern of the antennas;

Fig. 3 illustrates the relationship between the horizontal velocity of the airplane and its radial velocity toward the earth in the direction of the antenna beams;

Fig. 4 shows the Doppler frequency variation with respect to the angle of the antennas;

Figs. 5a and 5b show the complete circuit diagram of the apparatus; and

Fig. 6 illustrates the operation of the servo-control system used in the apparatus.

Referring to Fig. 1 the indicator employed comprises a compass card 200 rotatable about the axis of needle 201. The needle may be driven from a master compass of any type and by any suitable mechanism to indicate the magnetic or true heading of the aircraft when the card is in its zero or no-drift position. A gear 202 engages the periphery of card 200 and is driven by shaft 203 which is in turn driven by the drift servo. As will be shown later, the drift servo operates through shaft 203 and gear 202 to rotate card 200 from its no-drift position through an angle that always equals the drift angle and is in opposite direction thereto. For example, when the airplane is drifting 2° to the right of its apparent course, the compass card will assume a position 2° counterclockwise to its normal no-drift position making the compass reading a true reading of direction.

The basic principle involved is one of radio echo, and differs from more conventional radar in that it employs a continuous wave undergoing the Doppler effect due to the motion of the plane, as explained in succeeding paragraphs.

If an oscillator sends out radio waves of sufficiently high frequency, a certain amount of radiation will be reflected back by any object in the path of the waves. If the reflecting body is in motion it will receive a wave not of the outgoing frequency but of a frequency greater or less than the outgoing one by the number of wave lengths travelled by the reflecting body in a radial direction from the transmitter in one second. If the reflector is moving toward the transmitter, the received frequency will be greater than the transmitted one; if the reflector is moving away, the returned frequency will be less than the transmitted one by the same amount.

The reflector now sends back a portion of the received radiation towards the transmitter. Inasmuch as it is moving, it produces a second Doppler frequency shift as a virtual transmitter equal in degree and kind, to that produced by it as a receiver. Hence, by the time the original wave returns to its source, it has undergone a double Doppler shift.

This may be stated by the following equation:

$$FD = F \pm \frac{2V^1F}{C}$$

$F$ = original transmitted frequency
$V^1$ = component of velocity, $V$, moving radially from transmitter
$C$ = speed of light
$FD$ = reflected frequency For example, if the wave length of the transmitter is one foot, and if the reflector is moving toward the transmitter at the rate of 500 feet per second, the increase in frequency, or the Doppler frequency, will be $2 \times 500$ cycles per second or 1,000 cycles per second. It will be observed that, irrespective of other considerations, the higher the frequency employed, the greater the Doppler shift, and hence the more superior speed discrimination may be obtained.

Now if the transmitter is moving and the reflector standing still, such as is the case when the transmitter is mounted in an airplane, the earth becomes a source of Doppler reflections. Further, if the original wave be transmitted as a narrow beam toward the earth, and this beam has a horizontal component in the direction of flight of the plane, the resultant Doppler shift will be a function of the plane's speed as referred to the earth.

In this invention the above principle is applied for determining the actual direction of flight of an airplane.

It should be mentioned here that extremely high frequencies are most desirable for use in this system. The "S" band represents probably the lowest frequency usable. The "X" or "K" bands should be more desirable from a standpoint of mechanical, Doppler and electrical efficiency.

Similar transmitting and receiving antenna assemblies are to be mounted in the belly of the plane in such a manner that the axes of their parabolic reflectors are perpendicular to the plane of level flight. Each antenna with its reflector produces a conical beam with an angle $\theta$. Further, each antenna within the reflector is rotated or wobbled synchronously with the other about the axis of its respective paraboloid, causing its radiation conical beam to scan the earth at 30 cycles/sec., generating a cone of revolution of $\phi$ degrees, as measured from the axis of the cone of the radiated beam of angle $\theta$.

Fig. 2a is a diagram of a paraboloid representing either the transmitting or receiving reflector whose axis is vertical to the earth's plane, and whose antenna is being rotated to generate a cone of revolution, whose interception with the earth's plane benerates the dotted circle as shown, the radius of which is $$r = a \tan \frac{1}{2}\phi$$

Fig. 2a is a hypothetical case, for it portrays a filamentary radiated beam, where $\theta=0$, and would be the ideal case which can only be approached and never attained.

Fig. 2b represents the dynamic radiation pattern actually produced, where $\theta$ has a finite value which is determined largely as follows:

$$\theta = K\left(\frac{\text{paraboloid diameter}}{\text{transmitted frequency}}\right)$$

The two antenna assemblies are electrically and mechanically identical, with similar angular phasing and polarization and synchronously rotated about their respective paraboloid axes in order to maintain at all times their phase and polarization relationship as will be seen more clearly in Fig. 5a. The antennas are mounted close enough to each other in the airplane, that their dynamic radiation patterns are identical for practical purposes, considering the normal altitude an airplane maintains.

The desirability of minimum obtainable beam width becomes evident when it is remembered that the reflected Doppler frequency varies directly as the radial velocity of the transmitter. Hence, for a filamentary beam, all power is concentrated into a filament and the earth sends back a single Doppler frequency. This would be the ideal case.

The actual radiation achieved gives a somewhat more complicated condition, due to the finite value of the beam width. As stated before, for a filamentary beam $$FD = F \pm \frac{2V^1 F}{C}$$

where $V^1$ is the radial velocity of the target as seen from the transmitter. Referring to Fig. 3:

$$V^1 = V \sin \frac{\phi}{2}$$

for filamentary radiation.

But for actual conditions there are an infinite number of V's within the radiation cone of $\theta$. For each filament in front of or behind the center filament of the cone by an angle such that the difference in $V^1$ is equal to one transmitted wave length, the Doppler frequency will increase or decrease one cycle per second.

The situation is further complicated by the fact that the radiated beam width $\theta$ is taken as the width of the beam at its half-power point. Hence the intensity of the various Doppler radiations will also vary from the center of the beam to its outermost extremities and in a manner dependent upon the field strength pattern of the antenna assemblies. This pattern is largely a function of wave length to paraboloid diameter.

This latter statement at first hand would indicate that for this reason alone a shorter wave length would be predominantly superior than one, for example, twice as large. This is not entirely true however for any given permissible size of paraboloid, for, although as the wave length is decreased the beam width $\theta$ is reduced, the difference of $V^1$ required for a change of radial speed of one wave length per second is equally reduced, inasmuch as the sine closely approximates a linear function of the angle when the angle is small.

The optimum angle of the cone of revolution is determined principally by two factors.

First, the angle must be small enough to permit sufficient reflection to be directed back from the earth to the transmitter to produce adequate received signal. If the earth were a perfect plane reflecting surface, there would be reflection only if $\phi$ equalled zero. Inasmuch as the earth is far from a perfect plane as regards wave lengths in the order of 10 cm., some reflection back to the transmitter will occur if this or shorter wave lengths are employed.

Second, the angle $\phi$ must be large enough to provide a radial velocity component $V^1$ great enough to give a reasonably high Doppler frequency, such that the difference between maximum Doppler frequency and minimum Doppler frequency (the antennas pointed in direction of forward-motion of airplane vs. pointing in direction 180° to forward) gives good frequency discrimination.

This latter statement is the most important single reason for using the highest frequency possible compatible with power outputs of available oscillators.

Now, if the two antennas are rotated synchronously as described, and are phased so that each radiates in the same direction at any instant, they will sweep the earth in such a manner that their $V^1$ varies sinusoidally as the antennas point first in the direction of flight, sweep to 90° off flight direction, then opposite to flight direction, then 90° on the other side of flight direction, etc.

This variation in $V^1$ produces a similar variation in returned echo frequency FD since $$FD = F \pm \frac{2V^1 F}{C}$$

and $$V^1 = V \sin \tfrac{1}{2}\phi \cos \beta$$

where $\phi$ is the constant angle previously selected, and $\beta$ is the angle the antennas make at any instant with the direction of flight. Hence, letting $$2 \sin \tfrac{1}{2}\phi F = K,$$

$$FD = F + \frac{KV \cos \beta}{C}$$

The important feature of the above is that $V^1$ has a maximum value when the antennas are pointed in the direction of flight, which is not necessarily the direction the plane is pointing. These two directions will of course, be identical only when there is no drift of the airplane. This is the basis of operation of the instrument.

Fig. 4 gives an approximation of the echo frequency vs. $\beta$ relationship. What it does not portray is the spurious frequencies due to finite beam width. However, it does portray in a general way the net result as a sinusoidal variation of resultant Doppler frequencies.

The complete circuit diagram of an instrument for indicating true direction of flight in accordance with the invention is shown in Figs. 5a and 5b.

Referring to Fig. 5a, there is provided a power oscillator V1 of the velocity modulated type and a first local oscillator V2 of the crystal controlled type. The first local oscillator is designed to produce a frequency FL1 which is applied through secondary winding L23 to the control grid of power oscillator V1 to frequency modulate this tube. The No. 1 and No. 2 cavities of V1 are designed to resonate at frequency F, the transmitted frequency. Cavity No. 3 is designed to resonate at frequency F—FL1. Hence the output of cavity No. 2 is predominately F and the output of cavity No. 3 predominately F—FL1.

Radio frequency energy of frequency F from cavity No. 2 of V1 is applied through rotating coupling CT to transmitting antenna T which is housed in its paraboloid assembly. Reflected radio frequency energy of frequency $$FD = F + \frac{KV \cos \beta}{C}$$

is picked up by receiving antenna R, housed in its paraboloid. Both T and R, produce beams $\theta$ degrees wide, are electrically eccentric by an angle $$\frac{\phi}{2}$$

and free to rotate because of rotating couplings CT and CR. The reflected energy received by R is fed via coaxial cable and rotating joint CR to crystal mixer M.

The output of cavity No. 3 of V1 is fed via coaxial cable to filter No. 4 composed of two cavities tuned to F—FL1. The output of this filter is virtually entirely F—FL1, and is fed to the crystal mixer M where it is mixed with signal from antenna R.

The mixing process carried out by this crystal produces the sum and difference frequencies of its input signals. For the difference frequency $$\left(F + \frac{KV \cos \beta}{C}\right) - (F - FL1) = FL1 + \frac{KV \cos \beta}{C}$$

The sum frequencies are so high as to be virtually all attenuated in the mixer cavity 210. The output of the mixer therefore is a first intermediate frequency which varies sinusoidally between the limits $$FL1 + \frac{KV}{C}$$

and $$FL1 = \frac{KV}{C}$$

FL1, which may be termed the first intermediate frequency carrier, should preferably be a comparatively high frequency such, for example, as 30 megacycles.

There is a leakage from antenna T to antenna R of a small portion of the transmitted energy, due to the proximity of the antennas, and their respective side lobes. Mixing of this with the received Doppler signal in crystal mixer M would result in amplitude modulation of the first intermediate frequency of a spurious nature, and must be eliminated. This is done by feeding some of the energy from V1 into the coaxial line feeding the mixer M of such a phase as to be in exact phase opposition to the leakage energy, and of such amplitude to just neutralize the leakage energy. The correct phase of this counter feed is secured by correct placement of the counter feed input into the mixer coaxial feeder 211, and the correct amplitude is obtained by means of cavity attenuator A.

The two antennas are phase and synchronously driven, at 30 revolutions per minute, by the constant speed drive motor B1 via shafting and gears GT and GR as shown. This same motor also drives reference generator G1 synchronously with T and R. The purpose of this generator will be discussed later.

The first intermediate frequency, $$F - FL1 + \frac{KV \cos \beta}{C}$$

is fed from the crystal mixer M through terminal 212 to the grid of the first I. F. amplifier V3, Fig. 5b.

V3 is a conventional high frequency I. F. amplifier with tank circuit C31—L31, cathode bias resistor R31 and by-pass condenser C32, screen and plate decoupling resistor R32 with decoupling condensers C33 and C34, and C35 coupling condenser to the following I. F. amplifier stage V4. The input from crystal mixer M is fed to the grid of V3. The D. C. grid return and path for rectified crystal current is through choke L32 via meter I to ground. C36 protects the meter from any leakage R. F. current. Meter I thus gives an indication of the proper functioning and feed of first local oscillator V2, plus a rough indication of mixer crystal efficiency.

V4 represents the second stage of I. F. amplification, and is identical in function to V3, with the exception of the input, via coupling condenser C35, and grid return resistor R43. C41—L41 represents the tank circuit, R41 the cathode bias resistor and C42 the cathode by-pass condenser. R42, together with C43 and C44, form a screen and plate decoupling filter.

V5 is the third I. F. amplifier stage, and is identical to the second I. F. amplifier stage. C45 and R53 comprise the coupling from V4 while C51—L51 comprise the tank circuit. R51 is the cathode bias resistor, and C52 is cathode by-pass. R52, together with C53 and C54, form the plate and screen decoupling filter.

At this point it is necessary to heterodyne the first intermediate frequency with a second local oscillator. This is necessary because the percent deviation from FL1, the first I. F. carrier, as caused by the Doppler signal is insufficient to give good discrimination. It will be recalled that FL1 was chosen relatively high (in the neighborhood of 30 megacycles) in order to obtain good I. F. amplifier characteristics.

V6 is a combined second crystal controlled local oscillator and mixer comprised of crystal X2 and plate tank circuit C67—L62. Grid No. 2 of V6 acts as a plate in this circuit. R65 is the oscillator grid leak, R61 the cathode bias resistor and C62 the cathode by-pass. The output of above described oscillator section of V6 is electron coupled to the remaining section of V6 where it is mixed with the output of V5. C55 and R63 form the input coupling from V5 to this mixer section's control grid (grid No. 4). C61—L61 form the tank circuit for the resultant output of V6. C63, C64, and R62 comprise a decoupling filter, as do C65, C66, and R64.

The input to grid No. 4 of V6 is the first intermediate frequency $$FL1 + \frac{KV \cos \beta}{C}$$

Now, if the second local oscillator frequency FL2 is mixed with this input, the sum and difference frequencies appear in the output of V6. In this case, tank circuit C61—L61 produces a selective filtering action so that for practical purposes only the difference frequency is of sufficiently great amplitude to be useful. This difference frequency is $$FL1 - FL2 + \frac{KV \cos \beta}{C}$$

and may be termed the second intermediate frequency.

It consists of a carrier frequency FL1—FL2 about which varies the Doppler variation $$\frac{KV \cos \beta}{C}$$

The output of V6 is inductively coupled to the input of V7 via parallel resonant circuit L71—C71. V7 is an amplifier limiter, an overdriven, underbiased, variable-mu pentode, whose purpose is to remove all amplitude modulation from the signal and prepare it for the following discriminator V8. Amplitude modulation at this point would represent distortion of the signal, and hence would introduce error in the discriminator output.

R71 is a grid current limiting resistor which biases V7 because of grid current flowing in it. The higher the signal input, the more grid current is drawn, the higher the bias generated and the lower the amplification produced in the tube. C73 is the screen by-pass to ground, and R72 is the screen dropping resistor. C75 is a decoupling condenser.

V8 is a conventional frequency modulation discriminator. The second intermediate frequency is fed from the plate of V7 to tank circuit L72—C72. Tank circuit L81—C81 is inductively coupled to L72—C72, and also capacitively coupled to L72—C72 via C74. L81—C81 is tuned to the carrier frequency of the second intermediate frequency, FL1—FL2. R81, R82 are the load resistors for the two diodes of V8, and the mid-tap of R81 also serves as a direct current return to the mid-tap of L81, completing the D. C. diode circuit. C82 is the filter condenser for the output of the discriminator, and by-passes the high frequency components of the second I. F., leaving as the discriminator output only the 30 cycle current produced by the 30 cycle sweep of the antennas, and their received Doppler signal.

The output of V8 is coupled via C91 to the first grid of double triode V9. The first half of V9 is connected as a cathode follower in order to present a high and reasonably constant load impedance to discriminator V8. R91 is the grid leak, while R92 is the cathode load resistor.

The first half of V9 is coupled to the grid of the second half via C92. This second half is an overdriven, underbiased audio amplifier with cathode bias resistor, R93, cathode by-pass C93, grid lead R94 and plate load resistor R95. The output from the second half of V9 is a 30 cycle square wave, due to the limiting action of this section of V9. The 30 cycle square wave is fed to parallel grids of the double triode commutator tube V10 via condenser C94.

The plates of V10 are connected push-pull to the plates of V11. Tube V11 is an underbiased overdriven double triode used as a squaring amplifier. Its input is a sinusoid produced by single phase reference generator G1 (Fig. 5a), which is connected via gearing GS to the motor that rotates the two antennas T and R. G1 is driven at the same speed as the antennas, and hence its output sinusoid is always in synchronism, but not necessarily in phase, with the 30 cycle input to V10, as produced by the Doppler effect.

Transformer T1 produces 180 degree phase inversion of its input from G1 in order to feed tube V11 in push-pull. R111 and R112 are grid current limiting resistors, and R114 and R115 are plate load resistors. The plate outputs of each half of V11 are 30 cycle square waves, and the outputs are 180 degrees out of phase with each other.

The two parallel grids of tube V10 are biased to cut off for any plate voltage they may be subjected to by means of battery, BA10, coupled via R101.

It is the matter of phase relationship between the reference generator square wave and the Doppler-produced square wave which gives this system its drift sense. Referring to Fig. 6, this figure shows the voltages on the plates, grids and cathodes of both sections of tube V10 for the conditions (a) zero Doppler phase shift (no drift), (b) lagging Doppler phase shift, and (c) leading Doppler phase shift. The shaded areas indicate the flow of anode current. It will be noted that when the phase relationship of plate and grid square waves is as shown at (a) tube V10 will draw equal current in each cathode resistor, R103, R102, as shown. The net result will be the production of equal potentials as produced by filter condensers C101, C102, C103, at the cathodes of each half of V10.

Each cathode of V10 is coupled via resistors R122 and R132 to a respective grid of triodes, V12 and V13, and the potential developed at the cathodes of V10 helps form the bias of tubes V12 and V13.

V12 and V13 are power amplifiers which are normally balanced to give equal output by potentiometer R125, as fed by voltage divider R123, R124, when their grids receive no input.

Under the conditions shown at Fig. 6 (a), their output will still be balanced, and hence the split field servomotor B2 connected in the plate leads of V12 and V13 will not rotate, because its opposing fields are energized an equal amount.

It will be seen that any change in this balanced phase relationship will cause a different current to flow in the two sides of V10. A phase shift in either direction of the Doppler-produced 30 cycle wave with respect to the 30 cycle wave of the reference generator, will cause one-half of V10 to conduct more than the other. The half of V10 that conducts the wave current depends upon the direction of the phase shift. Conditions of unbalance in V10 are portrayed in Fig. 6 at (b) and (c).

Any unbalance in the output of V10 will cause an unbalance in the servomotor field, and the motor will rotate in one direction or the other, as determined by the direction of unbalance.

This servomotor rotates, by means of coupling 215 and a gear train 216—217 (Fig. 5), the field coils only of the reference generator G1 in such a direction as to bring about a phase relationship between its output and the 30 cycle Doppler-produced output such that V10 is balanced once more. When this has occurred, the entire system is balanced and no further rotation of the servomotor B2 occurs.

The reference generator must therefore have a somewhat unconventional mounting. Its armature rotates in the normal manner, but instead of its field and shell being mounted rigidly, there is a gear affixed to the shell 218 which changes the angular location of the fields with respect to the armature, and hence the antennas, at any instant. In order to initially set the generator phase so as to obtain the balanced condition of Fig. 6 (a) when there is zero drift, provision is made to rotatably adjust gear 217 with respect to shell 218. After proper initial adjustment has been made the gear 217 may be locked to shell 218 by slotted flange 219 and screw 220.

The same shaft that drives the shell of G1, also drives, through gear 202 (Figs. 1 and 5), the graduated compass dial, as described before.

The system is aligned so that a balanced output of V10 exists when there is zero drift of the airplane. That is, the square waves produced from the output of the 30 cycle reference generator and the 30 cycle Doppler-generated signal are as shown in Fig. 6 (a). Now, if the airplane starts to drift, there will be a relative phase shift between these two 30 cycle signals, inasmuch as the reference phase remains the same (i. e., that for flight along the axis of the plane, with no drift) but the Doppler-produced signal now changes from a maximum when the antennas are pointed along the major axis of the airplane to a maximum when the antennas are pointed in a direction to the left or right of the major axis, because of the direction of maximum speed of the airplane with respect to the earth having changed due to drift. This situation exists only momentarily, as the servo system operates to align the phase of these two signals to produce balance at the output of V10 once more.

G2 is a D. C. anti-hunt generator, and C121, C131, and R134 serve to differentiate its output and feed it to the grids of V12 and V13 via resistors R126 and R133. When servomotor B2 and anti-hunt generator G2 are running at constant speed no voltage is developed across resistor R134. However when the field energization of B2 is suddenly reduced to zero by tube V10 becoming balanced and B2 begins to lose speed, a voltage is developed across R134 in proper polarity to apply, through its action on the grids of tubes V12 and V13, a momentary reverse energization to motor B2 to bring it to a quick stop.

The time constant of the entire servo system should be long enough to override normal variations in Doppler echo produced by roll of the airplane, variations in terrain etc.

The power supplies shown in Figs. 5a and 5b are meant to be illustrative only. VR1 is a disc type rectifier fed by transformer TP1 to provide direct current for the filament of V1. LP1, LP2, CP1, CP2, form the smoothing filter, and RP1 the bleeder for this supply. C12, C13, C14, C15, L11, L12, form a decoupling filter to prevent radio frequency energy from being fed back to this power supply. VP1 is the high voltage cathode supply rectifier fed by TP2. Its output is smoothed by filter CP3, CP4, LP3. VP2 is the plate voltage rectifier fed by TP3, which supplies plate current for the rest of the equipment. Its output is smoothed by filter LP4, LP5, CP5, CP6. RP2 is a bleeder resistor.

What I claim is:

1. A device for determining the angle of drift of an airplane, said device comprising means on the airplane for generating a sharp beam of high frequency radiant energy having a fixed angle with respect to the vertical, means for rotating said beam about a vertical axis at constant angular velocity, means on said airplane for receiving reflections of said energy from the earth, the frequency of said received energy varying sinusoidally between a maximum value when said beam is pointing in the direction of flight of said airplane and a minimum value when said beam is pointing in a direction opposite to the direction of flight, said sinusoidal frequency variation having a period equal to the period of rotation of said beam, means for deriving from said received energy a sinusoidal voltage having the same frequency as said sinusoidal frequency variation and having a fixed phase relative thereto, and means for comparing the phase of said derived voltage with the phase of the rotational cycle of said beam to determine the magnitude and direction of the angle between the apparent and real directions of flight of the airplane.

2. A drift meter for airplanes comprising a pair of similar highly directive antennas mounted on the airplane and arranged to scan conically and in the same phase about vertical axes, a transmitter coupled to one of the antennas for continuously applying high frequency energy of constant frequency thereto, a receiver coupled to the other antenna for continuously receiving reflections of said high frequency from the earth, said received energy being frequency modulated as a result of the Doppler effect and the conical scanning at a modulating frequency equal to the scanning frequency, means in said receiver for deriving from said frequency modulated energy an alternating voltage wave of said modulating frequency, and means for comparing the phase of said derived voltage with the phase of the scanning cycle of said beams to determine the magnitude and direction of the angle between the apparent and real direction of flight of the airplane.

3. Apparatus as claimed in claim 2 in which said comparing means comprises a generator for generating a single phase alternating reference voltage of the scanning frequency and synchronized therewith, means for shifting the phase of said reference voltage, means for initially setting said phase shifting means so that said reference voltage has a predetermined phase relation to said derived voltage in the absence of drift, means coupled to said phase shifting means and responsive to a departure of said reference and derived voltages from said predetermined phase relationship to restore said relationship through adjustment of said phase shifting means, and means coupled to said phase shifting means for producing an angular rotation from a no-drift position that always equals the angular difference between the instantaneous phase of the reference voltage and the phase of the reference voltage when said phase shifting means has its initial setting, said angular rotation being equal to the angle of drift.

4. An instrument for indicating the true direction of flight of an airplane relative to the earth comprising a transmitting antenna and a receiving antenna mounted in close proximity on the airplane, said antennas being electrically identical and designed to produce a sharp beam at a fixed angle to the vertical, means for rotating the beams at a constant rate and in the same phase about vertical axes passing through the center of the antennas, means for applying high frequency electrical energy to said transmitting antenna whereby high frequency radiant energy is directed thereby toward the earth, receiving means coupled to said receiving antenna for receiving reflections of said high frequency radiant energy from the earth, said received energy having a sinusoidal variation in frequency between a maximum value when said beams point in the direction of flight of the airplane and a minimum value when said beams point 180° away from the direction of flight of the airplane, said sinusoidal frequency variation being of the same period as the rotational period of said beams, means in said receiving means for deriving from said received energy a sinusoidal voltage wave of the same frequency as said sinusoidal frequency variation and having a fixed phase relative thereto, means for generating a single phase alternating reference voltage of the same period as the rotational period of said beams and synchronized with the rotation of said beams, means for shifting the phase of said reference voltage, means for initially setting said phase shifting means so that said reference voltage has a predetermined phase relation to said derived voltage when the apparent and true directions of flight are the same, servo-control means coupled to said phase shifting means and responsive to a departure of said reference and derived voltages from said predetermined phase relationship to restore said relationship through adjustment of said phase shifting means, a direction indicator comprising a pointer and a dial graduated in degrees both rotatable about a common center, means for angularly positioning said pointer in accordance with the earth's magnetic field, and coupling means between said dial and said phase shifting means for producing, in response to adjustment of said phase shifting means by said servo-control system, a rotation of said dial from a zero-drift position through an angle that always equals the degrees of difference between the phase of the reference voltage at the given time and the phase of the reference voltage when said phase shifting means has its initial setting, whereby said direction indicator always reads the true direction of flight.

References Cited in the file of this patent

UNITED STATES PATENTS

| | | |
|---|---|---|
| 1,958,259 | Becker | May 8, 1934 |
| 2,223,224 | Newhouse | Nov. 26, 1940 |
| 2,247,029 | Luck | June 24, 1941 |
| 2,459,074 | Hastings-Hodgkins | Jan. 11, 1949 |
| 2,476,032 | Feldman | July 12, 1949 |